United States Patent [19]
Kawabe et al.

[11] Patent Number: 4,985,756
[45] Date of Patent: Jan. 15, 1991

[54] SPECIAL EFFECT SYSTEM FOR VIDEO SIGNAL

[75] Inventors: Shigehisa Kawabe; Keiichi Hirayama, both of Tokyo, Japan

[73] Assignee: NEC Corporation, Japan

[21] Appl. No.: 266,698

[22] Filed: Nov. 3, 1988

[30] Foreign Application Priority Data

Nov. 6, 1987 [JP] Japan .................. 62-280648

[51] Int. Cl.$^5$ ............................... H04N 9/535
[52] U.S. Cl. .......................... 358/22; 358/160
[58] Field of Search ......................... 358/22, 160

[56] References Cited

U.S. PATENT DOCUMENTS

4,831,445  5/1989  Kawabe .................. 358/160

Primary Examiner—James J. Groody
Assistant Examiner—David E. Harvey
Attorney, Agent, or Firm—Ostrolenk, Faber, Gerb & Soffen

[57] ABSTRACT

A television video signal processing circuit for imparting to a television picture special effects includes special function generators and picture pixel distance calculating circuits which enable pixels to be rearranged to create a special effect such as the folding of a portion of the picture unto itself or the rolling up thereof with reference to a predesignated straight line. A brightness contrast control circuit alters the brightness information in certain portions of the picture to accentuate given regions thereof so that the image appears to the viewer as if it were three dimensional.

4 Claims, 6 Drawing Sheets

SPECIAL EFFECT SYSTEM FOR VIDEO SIGNAL

BACKGROUND OF THE INVENTION

The present invention relates to a special effect system for a television video signal, and particularly to a special effect system which produces special effects in which a video image is bent or turned, rolled up or is waved with reference to a designated reference straight line.

In a special effect system for a television video signal, various special effects are generated by storing a digital video signal in a memory and by producing special write or read address sequences which impart to the video signal a desired special effect. To obtain such special addresses, a function generating circuit in which a multiplier, a divider, an adder and a subtracter are combined is conventionally used. The resulting circuit is extremely complicated. Particularly, in order to generate effects in which the video image is turned, rolled up or waved with reference to the designated reference straight line, a trigonometric function and a hyperbolic function need to be generated. Conventionally, many multipliers, dividers, adders and subtracters are required for generating such functions and for modifying the generated functions. The combination thereof must be changed at times, thus resulting in a disadvantageous complicated configuration.

In order to overcome the aforementioned disadvantages, a new special effect system has been proposed in U.S. patent application Ser. No. 131,900 filed Dec. 11, 1987 and entitled "SPECIAL EFFECT SYSTEM FOR VIDEO SIGNAL". In the proposed system, one straight line is set up on a TV screen and a distance between the position of any given picture element and the straight line is calculated. In response to the calculated distance, a readable function memory delivers effective parameters to read out video data from a video memory so as to produce a special video effect. The proposed system has a relatively simple circuit configuration for producing special video effects.

However, the proposed system has the disadvantage that the turned and rolled-up effect images appear flat, i.e. two dimensional. In other words, turned and rolled-up images are not perceivable by a viewer to be three dimensional even though such effect images are oriented three-dimensionally.

SUMMARY OF THE INVENTION

It is therefore an object of the present invention to provide a special effect system for a video signal which is capable of producing turned and rolled-up images which appear three-dimensionally on a TV screen.

According to the present invention there is provided a special effect system for video signal which includes a write address generating means, a video memory means, a reading address generating means and a brightness modifying means receiving video data from the video memory means, wherein a special effect picture is created by controlling a read address generated by the reading address generating means, the reading address generating means comprising: a means for setting constants, a, b, c associated with a straight line working as a reference for effect on a video image, the straight line corresponding to $(ax+by+c=0)$; a coordinate generator receiving a clock synchronized with a television sequence for generating an x-coordinate and a y-coordinate, said x-coordinate and y-coordinate defining coordinates (X, Y) of an arbitrary picture element; a distance calculating means for calculating a distance d of the coordinates (X, Y) defined by the coordinate generator to said straight line specified by said constants a, b and c; a function generator for generating first and second function data f(d) and g(d) according to functions specified beforehand in response to the distance d delivered from the distance calculating means; a read address producing means for producing a read address to be supplied to the video memory means in response to the first and second function data f(d) and g(d) from the function generator, the coordinates (X, Y) from the coordinate generator and the constants a and b from the setting means; and another function generator for generating a brightness modifying factor in response to the distance d, whereby the brightness modifying means modifies brightness of the arbitrary picture element in accordance with the brightness modifying factor.

PREFERRED EMBODIMENT OF THE INVENTION

Figure 1:
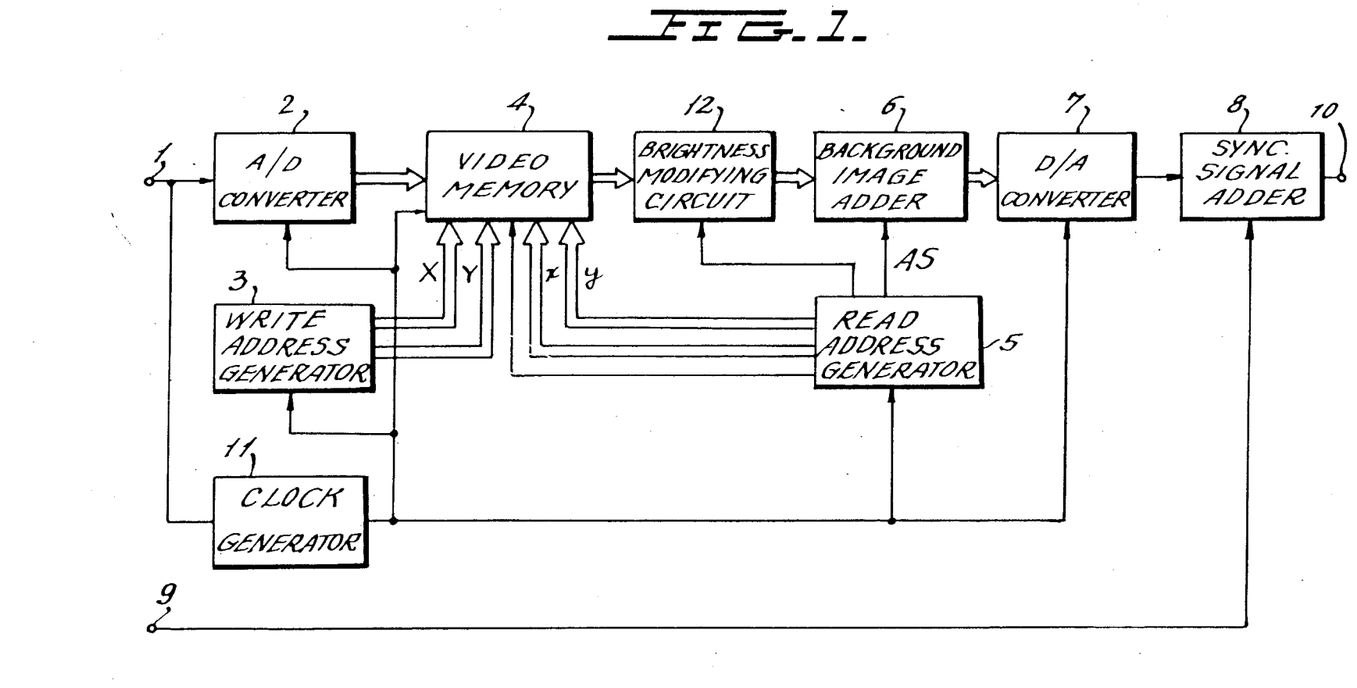
FIG. 1 is a block diagram of a special effect system for a video signal according to the present invention.

FIG. 1 is a block diagram of a special effect system for a television video signal according to the present invention. In FIG. 1, an analog television signal is fed to an input terminal 1, and an A/D converter 2 converts the analog video signal from the input terminal 1 into a digital (PCM) video signal. A write address generator 3 generates a write address determining a location of a video memory 4 where the digital video signal is stored. A read address generator 5 generates a read address for reading out the stored video signal from the video memory 4. A background image adder 6 adds a background image to the digital video signal read out from the video memory 4. A D/A converter 7 converts the digital video signal delivered from the background image adder 6 into an analog video signal. A synchronizing signal adder 8 adds a reference synchronizing signal fed from an input terminal 9 to the analog video signal from the D/A converter 7 and feeds its output signal to an output terminal 10. A clock generator 11 generates a clock which is synchronized with the input video signal and supplies it to the A/D converter 2, the address generators 3 and 5 and the D/A converter 7.

In FIG. 1, in a novel manner, a brightness modifying circuit 12 is provided between the video memory 4 and the background image adder 6. Therefore, except for the brightness modifying circuit 12 and to be described novel configuration of the read address generator 5, the rest of the circuit is the same as the one disclosed in the aforementioned U.S. patent application Ser. No. 131,900.

In the system of FIG. 1, the analog television video signal is converted into an 8-bit binary code, for example, by the A/D converter 2, and the write address generated by the write address generator 3 is constructed of x-coordinate and y-coordinate components. Then, the digital video signal from the A/D converter 2 is stored into the video memory 4 in a location determined by the x-coordinate and the y-coordinate addresses. The read address generator 5 similarly generates a reading address which also has an x-coordinate and a y-coordinate and supply it to the video memory 4. The stored digital video signal is read out from the video memory 4 in accordance with the x-coordinate and the y-coordinate generated by the read address generator 5.

Figure 2:
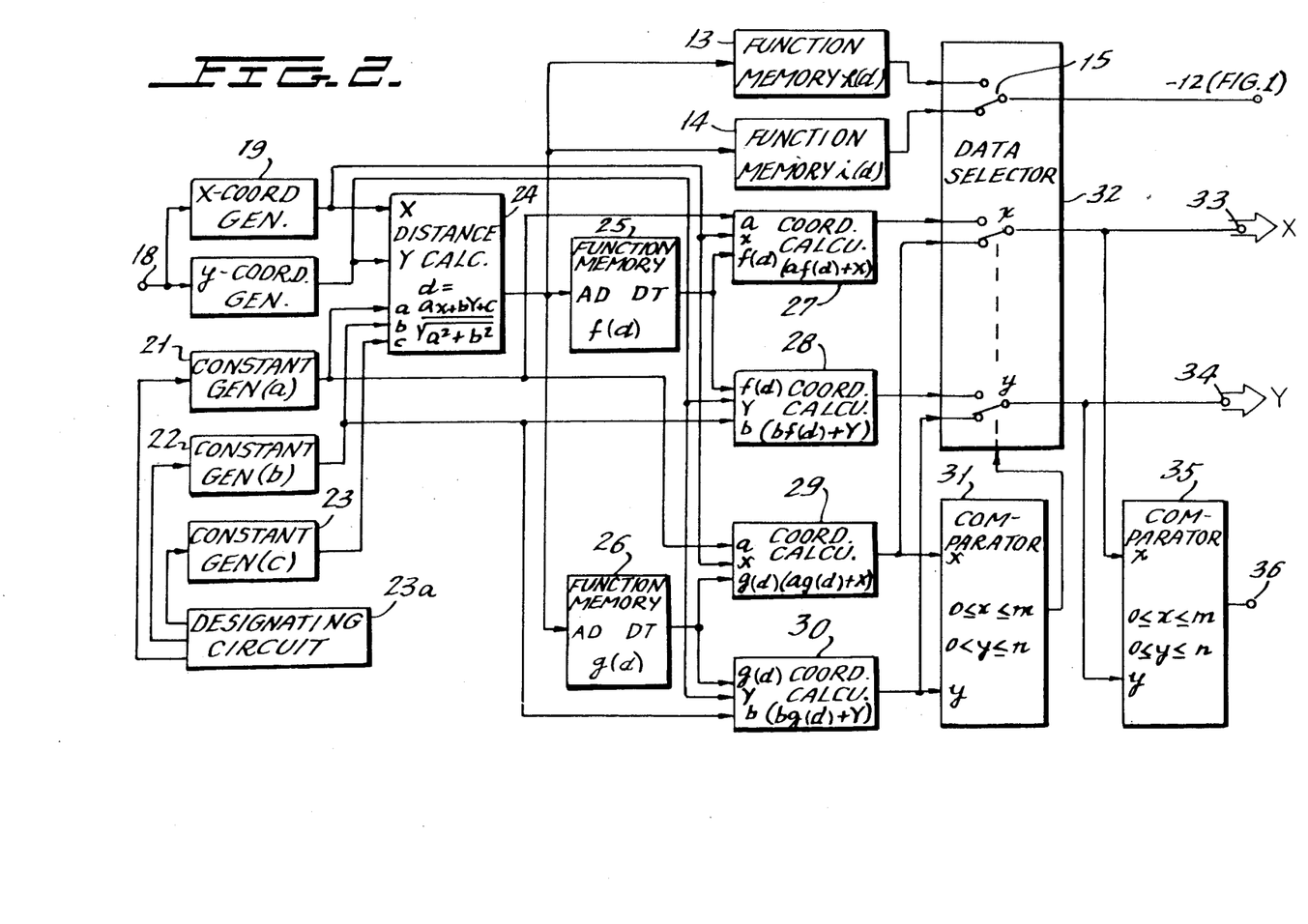
FIG. 2 is a block diagram of reading address generator for a video memory according to the present invention.

FIG. 2 is a more specific block diagram of the read address generator 5 shown in FIG. 1. In FIG. 2, except for function memories 13 and 14 and a switch 15 in a data selector 32, the construction thereof is the same as the aforementioned proposed system. In the figure, an x-coordinate generator 19 and a y-coordinate generator 20 generate an x-coordinate X and a y-coordinate Y by counting a clock signal fed from an input terminal 18. Constant generators 21, 22 and 23 generate constants a, b and c, respectively, under a control of a designating circuit 23a. A distance calculator 24 calculates a distance from a point (X, Y) to a straight line L. In this case, the point (X, Y) is determined by the x-coordinate X and the y-coordinate Y delivered from the generators 19 and 20, and the straight line L is indicative of an aggregation of the points satisfying $ax+by+c=0$. Therefore, the distance d is obtained by the following equation:

$$d = (aX + bY + c)/\sqrt{a^2 + b^2}$$

The straight line L divides an image area into two areas, and a sign (plus or minus) is also determined with regard to the calculated distance d in accordance with an area where the point (X, Y) belongs.

Figure 3:
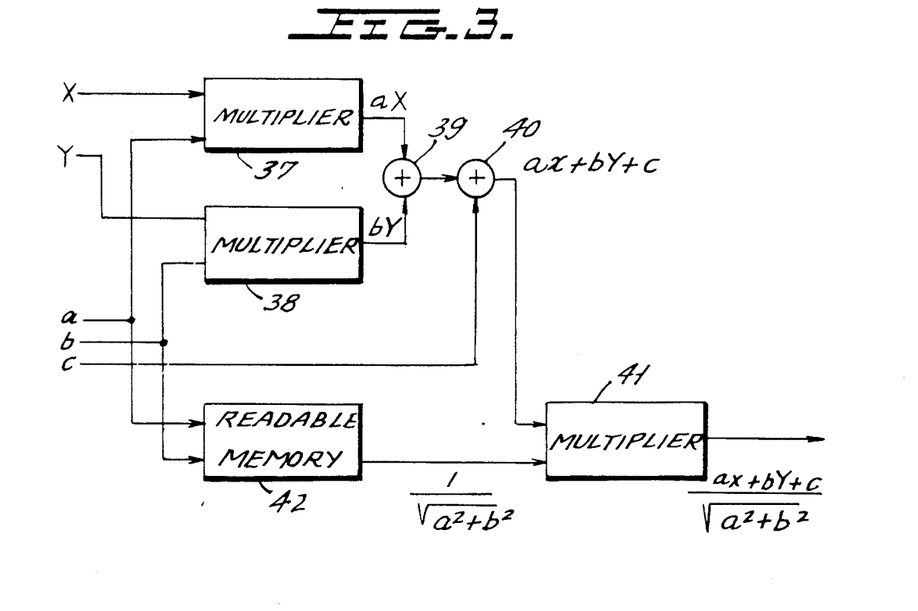
FIG. 3 is a block diagram of a distance calculator shown in FIG. 2.

The distance calculator 24 is shown in block form in FIG. 3. In FIG. 3, in response to receiving data X, Y, a, b and c, multipliers 37 and 38 calculate aX and bY, respectively, and an adder 39 calculates (aX+bY). Further, an adder 40 calculates (aX+bY+c) and a multiplier 41 calculates $(aX+bY+C) / \sqrt{a^2+b^2}$. In this case, a readable memory 42 previously stores various data of $$\frac{1}{\sqrt{a^2 + b^2}}$$

and delivers $$\frac{1}{\sqrt{a^2 + b^2}}$$

in accordance with input data a and b. The readable memory 42 can be a suitably programmed programable read only memory (PROM). Or, since the values a and b are not changed during at least one vertical scanning period (16.7 m seconds), $$\frac{1}{\sqrt{a^2 + b^2}}$$

can be calculated in real time by a small size general purpose computer while receiving data a and b. One example of such a computer is the Am29516/17 manufactured by Advanced Micro Devices, Inc.

Turning back to FIG. 2, a function memory 25 is constituted of a programable read only memory (PROM) or a read/write memory (RAM), for example. The memory 25 is previously loaded with pertinent values so as to deliver a function f(u) when it receives an input u at its read address lines. Similarly, another memory 26 delivers a function g(u) while receiving an input u as a read address. Both memories 25 and 26 are used as function generators in the invention, consequently. A coordinate calculator 27 calculates a coordinate (a f(d)+X) in response to the constant a, the x-coordinate X and the function f(d). A coordinate calculator 28 calculates a coordinate (b f(d)+Y) in response to its inputs b, Y and f(d). A coordinate calculator 29 calculates a coordinate (a g(d)+X) in response its inputs a, X and g(d). Further, a coordinate calculator 30 calculates a coordinate (b g(d)+Y) in response to its inputs b, Y and g(d).

A comparator 31 receives the coordinate value x, i.e., (a g(d)+X) and the coordinate value y, i.e., (b g(d)+Y) from the coordinate calculators 29 and 30, and generates a logical value "1" only when $0 \leq x \leq m$ and $0 \leq y \leq n$. In this case, the value m is determined as a maximum value of the x-coordinate and the value n is determined as a maximum value of the y-coordinate. Otherwise, the comparator 31 generates a logical value "0". A data selector 32 selects the outputs (a f(d)+X) and (b f(d)+Y) of the coordinate calculators 27 and 28, and delivers them to output terminals 33 and 34, respectively, when the logical value delivered from the comparator 31 is "0" and unless a value of the function g(d) is undefined. In this case, the data selector 32 selects the outputs (a g(d)+X) and (b g(d)+Y) of the coordinate calculators 29 and 30, and delivers them to the output terminals 33 and 34, respectively, when the logical value delivered from the comparator 31 is "1" and the function f(d) is defined, or when the function g(d) is undefined and the function f(d) is defined.

Another comparator 35 generates a logical value "1" to an output terminal 36 only when the coordinate values x and y supplied to the output terminals 33 and 34 satisfy $0 \leq x \leq m$ and $0 \leq y \leq n$, respectively. Otherwise, the comparator 35 generate the logical value "0" to the terminal 36. As noted above, the value m corresponds to the maximum value of the x-coordinate and the value n corresponds to the maximum value of the y-coordinate.

For example, the constants a, b and c are designated under the condition where $a^2+b^2=1$, $a>0$, $b>0$, $0<c<m$ and $0<c<n$.

Figures 4, 5:
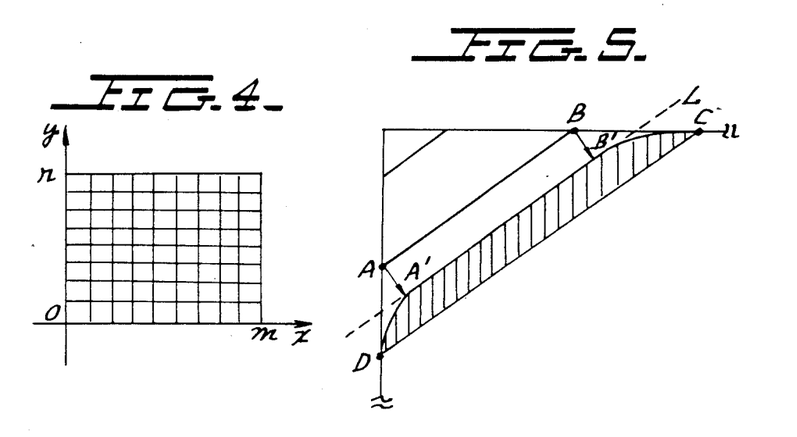
FIG. 4 shows an inputted video image which is to be subjected to image transformation.
FIGS. 5 and 6 are diagrams for explaining an underlying image transformation.

The, an operation of the above embodiment is described below. It is now assumed that a video image shown in FIG. 4 is supplied to the special effect system according to the present invention. The input video data are stored in the video memory 4 (FIG. 1).

Next, for reading operation, the distance d determined between a position (X, Y) of a picture element to be indicated on a television screen and the straight line L defined by $(ax+by+c=0)$ is calculated by the equation $\{d=(ax+by+c)/\sqrt{a^2+b^2}\}$. After this, the coordinate calculators 27, 28, 29 and 30 calculate (a f(d)+X), (b f(d)+Y), (a g(d)+X) and (b g(d)+Y) in response to the function outputs f(d) and g(d) from the memories 25 and 26 and the constants a, b and c. from the constant generators 21, 22 and 23. The comparator 31 selects the set of (a f(d)+X) and (b f(d)+Y) or the set of (a g(d)+X) and (b g(d)+Y), and delivers the selected set as a reading address of x-coordinate and y-coordinate which is used for reading video data stored in the video memory 4.

Figure 6:
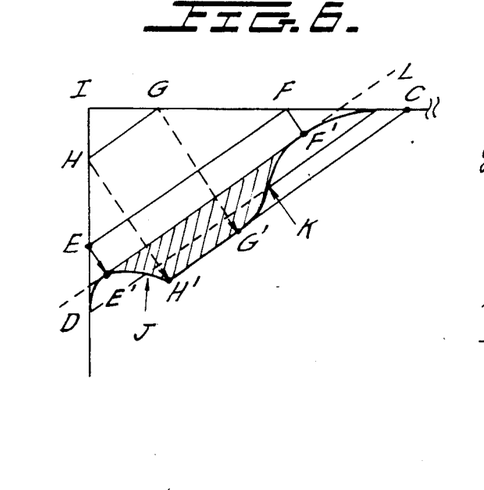

Here, the coordinate conversion that the coordinates (a f(d)+X, b f(d)+Y) are produced with respect to the coordinates (X, Y) means that a trapezoidal domain ABCD is transformed into a domain A'B'CD as shown in FIG. 5. Similarly, the coordinate convertion of the coordinates (a g(d)+X, b g(d)+Y) with respect to the coordinates (X, Y) means that a trapezoidal domain EFGH is transformed into a domain E'F'G'H' as shown in FIG. 6. In this case, a domain GHI disappears after the transformation. Further, a portion in the domain A'B'CD over-lapping the domain E'F'G'H' disappears by the operation of the data selector 32.

Figure 7:
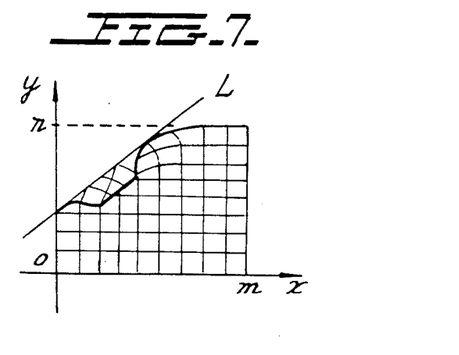
FIG. 7 shows an effective video image corresponding to the inputted video image shown in FIG. 4.

Consequently, as shown in FIG. 7, there is obtained an effect wherein an input video image is so transformed that it is rolled up along an inner cylinder of radius r. Here, in order to produce the effect as shown in FIG. 7, functions f and g are defined as follows:

| | | | |
|---|---|---|---|
| $f(t)$ | = | undefined | $t<0$ |
| $f(t)$ | = | $(r-t)-r(\arcsin(r-t)/r)$ | $0 \leq t < r$ |
| $f(t)$ | = | 0 | $r \leq t$ |
| $g(t)$ | = | undefined | $t<0$ |
| $g(t)$ | = | $(r-t)+r(\arcsin(r-t)/r)-\pi)$ | $0 \leq t < 2r$ |
| $g(t)$ | = | undefined | $2r \leq t$ | where r denotes a constant, and "undefined" means that an output can not be defined in the function generator 25 or 26, i.e., output values of the coordinate calculators 27, 28, 29 and 30 become less than 0 or greater than the maximum values m and n.

Then, $y=\arcsin(x)$ indicates an inverse function of the trigonometric function $y=\sin(x)$ within $-\pi/2 \leq x \leq \pi/2$. These functions f and g are graphically shown in FIG. 8 and FIG. 9, respectively.

Instead, the functions f and g can be defined as follows:

| | | | |
|---|---|---|---|
| $f(t)$ | = | undefined | $kr-r>t$ |
| $f(t)$ | = | $(kr-t)-r\arcsin((kr-t)/r)$ | $kr>t \geq kr-r$ |
| $f(t)$ | = | 0 | $t \geq kr$ |
| $g(t)$ | = | undefined | $kr-r>t$ |
| $g(t)$ | = | $-2t-(kr-t)+r\arcsin((kr-t)/r)$ | $kr>t \geq kr-r$ |
| $g(t)$ | = | $-2t$ | $t \geq kr$ | where k is a constant equal to $\frac{1}{2}$ of $\pi$, r is a constant, "undefined" is a constant at which output values of the coordinate calculators 27, 28, 29 and 30 are less than 0 or greater than the maximum value m of the x-coordinate and the maximum value n of the y-coordinate. Then, $y=\arcsin(x)$ indicates the inverse function of the trigonometric function $y=\sing(x)$ within $$-\frac{\pi}{2} \leq x \leq \frac{\pi}{2}.$$

Figure 10:
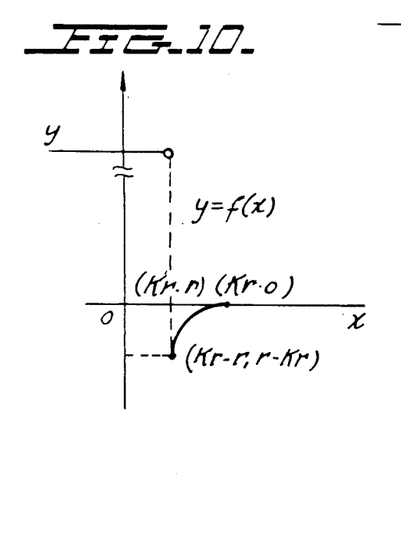
FIGS. 10 and 11 are diagrams showing other functions f(x) and g(x)
Figure 11:
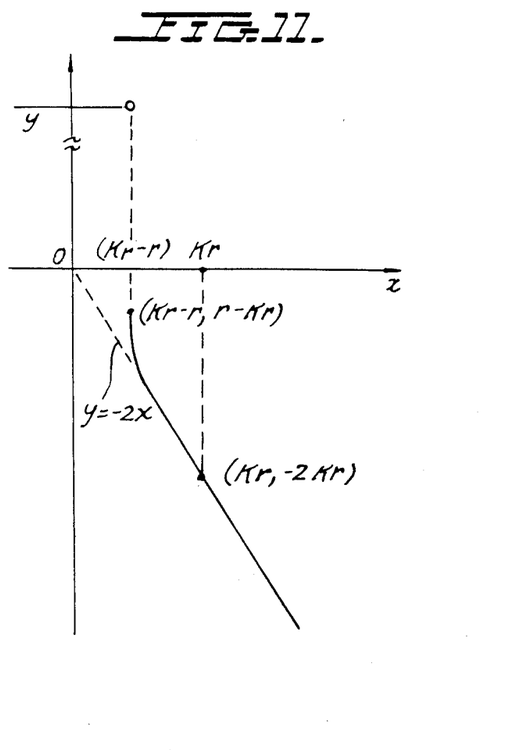
Figure 12:
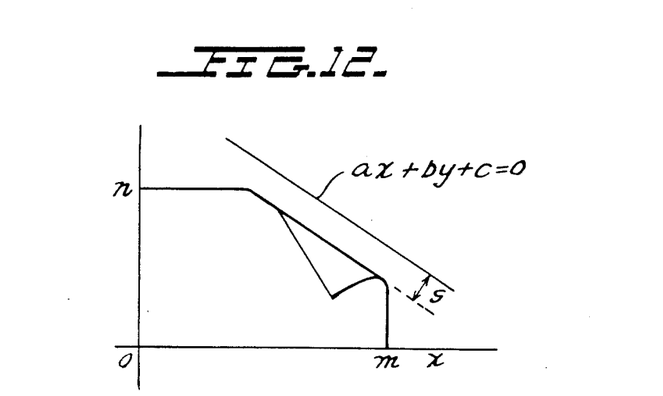
FIG. 12 is a diagram showing a special-effected video image corresponding to the inputted video image of FIG. 4 which is realized by using the functions shown in FIGS. 10 and 11.

FIGS. 10 and 11 graphically show the functions f and g, respectively. Further, the constants a, b and c are specified under the condition where $\sqrt{a^2+b^2}=1$, $a<0$, $b<0$, $0<c<m$ and $0<c<n$. As a result, there is obtained an effect wherein an input video image shown in FIG. 4 is so transformed that it is turned up along a cylinder of radius r as shown in FIG. 12 (page-turn effect). In FIG. 12, S corresponds to $(kr-r)$.

Further, the function f is defined as follows:

$$f(t)=r\sin(t/r)$$

Figure 13:
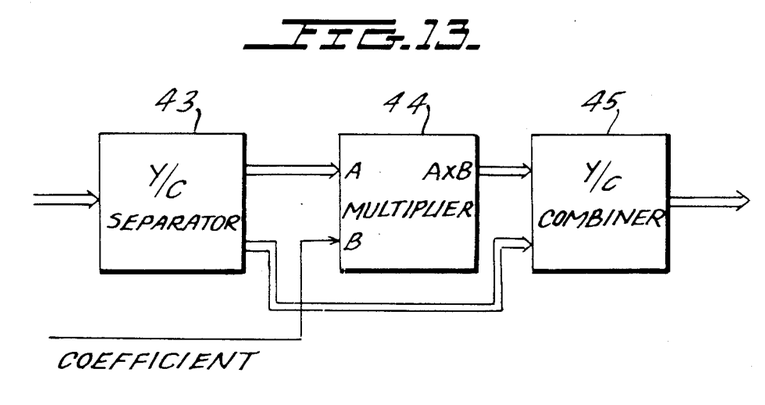
FIG. 13 is a block diagram of the brightness modifying circuit shown in FIG. 1.

The brightness modify operation according to the present invention is described next. One example of the brightness modifying circuit 12 (FIG. 1) is shown in FIG. 13. In FIG. 13, a Y/C separator 43 receives the video data read out from the video memory 4 and separates the luminance (Y) component and the chrominance (C) component. The separated Y component is multiplied by a given coefficient by a multiplier 44. The coefficient is supplied from the read address generator 5. Then, a Y/C combiner 45 combines the multiplied Y component from the multiplier 44 and the separated C component from the Y/C separator 43 and delivers the combined output to the background image adder 6. By means of the brightness modifying circuit 12, the brightness at a region close to a top surface of the turned and rolled-up image is relatively increased. Therefore, a shaping effect is generated and the turned and rolled-up effect image obtained by the present invention is perceived three-dimensionally by a viewer.

Figure 14:
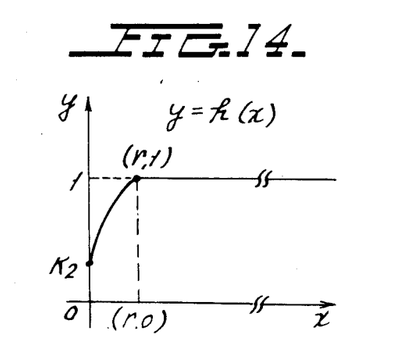
FIGS. 14 and 15 are diagrams showing functions h(x) and i(x) used for brightness modification.
Figure 15:
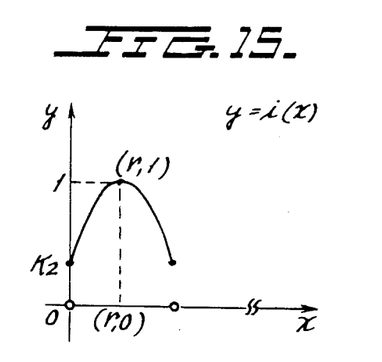

Next, the generation of the aforementioned coefficient which is supplied to the multiplier 44 (FIG. 13) from the switch 15 (FIG. 2) is described. The value of the coefficient is determined in response to the distance d calculated by the distance calculator 24 shown in FIG. 2. In FIG. 2, the calculated distance d is supplied to function memories 13 and 14. The function memories 13 and 14 are constituted of a programable read only memory (PROM) or a read/write memory (RAM) and of various previously stored coefficient data corresponding to functions h(d) and i(d), respectively stored therein. Like the function memories 25 and 26, the memories 13 and 14 receive the calculated distance d as a read address and deliver the coefficients as their outputs. Examples of the functions h(t) and i(t) stored in the memories 13 and 14, respectively, are graphically shown in FIGS. 14 and 15. The functions h(t) and i(t) are defined by the following equations:

$$h(t) = 0 \quad\quad t < 0$$
$$h(t) = K_1 \cos\left(\frac{\pi}{2}(t/r) - 1)\right) + K_2 \quad 0 \leq t < r$$
$$h(t) = 1 \quad\quad r \leq t$$
$$i(t) = 0 \quad\quad t < 0$$
$$i(t) = K_1 \cos\left(\frac{\pi}{2}(t/r) - 1)\right) + K_2 \quad 0 \leq t < 2r$$
$$i(t) = 0 \quad\quad 2r < t$$

where $K_1$ and $K_2$ denote arbitrary constants under conditions wherein $K_1 + K_2 = 1$, $K_1 \geq 0$ and $K_2 \geq 0$.

Figure 8:
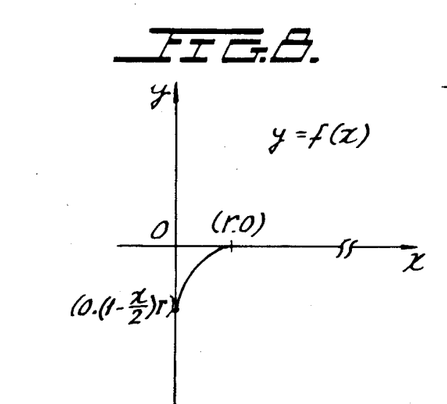
FIGS. 8 and 9 are diagrams showing functions f(x) and g(x) associated with the special-effected video image shown in FIG. 7.
Figure 9:
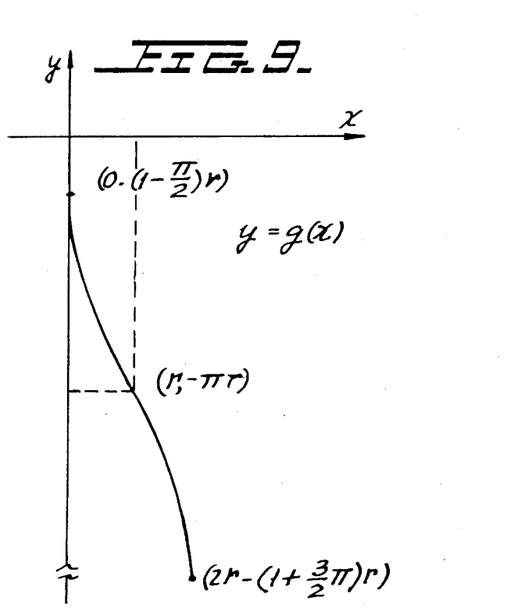
Figure 16:
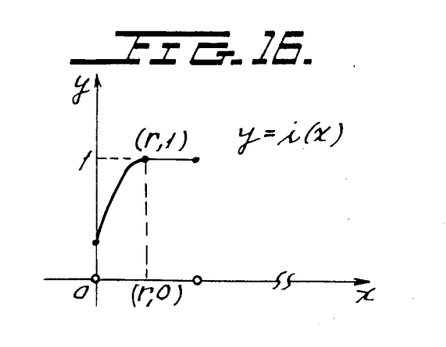
FIG. 16 is a diagram graphically showing another function i(x).

On the assumption that the functions f(x) and g(x) shown in FIGS. 8 and 9 are applied for image transformation, when the selector 32 selects (a f(d)+X) and (b f(d)+Y) as the x-coordinate and the y-coordinate, the output h(t) of the function memory 13 is selected as the coefficient for brightness modification. In this case, as shown in FIG. 5, the trapezoidal domain ABCD is transformed into the domain A'B'CD. Thus, by applying the function h(t), the brightness of the region close to the line CD is increased and the brightness of the region close to the line A'B' is relatively decreased. Further, when the selector 32 selects (a g(d)+X) and (b g(d)+Y), the output (i(t)) of the function memory 14 is selected as the coefficient for brightness modification. In this case, the trapezoidal domain EFGH is transformed into the domain E'F'G'H' as shown in FIG. 6. Thus, by applying the function i(t), the brightness of the region close to a line segment JK in the line CD is increased and the brightness of the region close to the lines E'F' and H'G' is relatively decreased.

Where the functions f(x) and g(x) shown in FIGS. 10 and 11 are used for image transformation, it is also possible to use the functions h(x) and i(x) shown in FIGS. 14 and 15 for the brightness modification. However, it may be preferable to use another function such as that shown in FIG. 16 for the function i(x). Furthermore, arbitrary various functions can be applied for the functions h(x) and i(x) to change the brightness and, therefore, various special effect images can be obtained accordingly.

As described above, the special effect system of the present invention is capable of adding brightness contrast to a transformed image. This enables a viewer to observe the transformed image three-dimensionally by a combination of the distance calculator and the function memory storing brightness modifying coefficients. Further, by changing contents of the function memory, various three-dimensionally effective images can be easily obtained.

What is claimed is:

1. A special effect system for processing a video signal, the system including:
   a video memory;
   write address generating means for generating a write address for storing an image in the video memory;
   reading address generating means for generating a read address, wherein a special effect picture is created by controlling the read address generated by said reading address generating means, said reading address generating means comprising:
   means for setting constants a, b, c, said constants associated with a straight line which acts as a reference line for a special effect imparted to a video image, said straight line defined by (ax+by+c=0);
   a coordinate generator, responsive to a clock signal which is synchronized with a television sequence, for generating an x-coordinate and a y-coordinate, said x-coordinate and said y-coordinate defining coordinates (X, Y) of an arbitrary picture element;
   a distance calculating means for calculating a distance d of the coordinates (X, Y) to said straight line specified by said constants a, b and c;
   a first function generator for generating first and second function data f(d) and g(d) according to first predefined input/output relationships and based on said distance d;
   a read address producing means for producing the read address for the video memory based on the first and second function data f(d) and g(d), the coordinates (X, Y) and the constants a and b;
   a second function generator for generating third and fourth function data h(d) and i(d) according to second predefined input/output relationships and based on said distance d; and
   brightness modifying means coupled to said video memory for modifying the magnitude of a luminance component contained in a video signal read-out from said video memory in response to the third and fourth data h(d) and i(d).

2. The special effect system of claim 1, said brightness modifying means including a Y/C separator for separating the luminance component and a chrominance component from the read-out video signal from said video memory, a selector for selecting for outputting one of the third and fourth function data h(d) and i(d), a multiplier for multiplying the level of the luminance component by the output of said selector to produce a modified luminance component, and a Y/C combiner for combining the modified luminance component and the chrominance component to generate a transformed video image.

3. The special effect system of claim 1, said read address generating means including:
   means for calculating a first x-address value equal to {a f(d)+X};
   means for calculating a second x-address value equal to {a g(d)+X};
   means for calculating a first y-address value equal to {b f(d)+Y};
   means for calculating a second y-address value equal to {b g(d)+Y};
   x-address switching means for switching said first x-address value {a f(d)+X} and said second x-address value {a g(d)+X};
   y-address switching means for switching said first y-address value {b f(d)+Y} and said second y-address value {b g(d)+Y}; and
   means for receiving said first x-address and y-address values and for controlling said x-address switching means, y-address switching means and said selector according to values of the received addresses values.

4. A special effect system of the type having an A/D converter for obtaining a digital video signal from an analog video signal, a video memory for storing said digital video signal from said A/D converter, a write address generator for generating a write address determining a location in said video memory where said digital video signal is to be written, a read address generator for generating a read address to read the stored digital video signal from said video memory and a D/A converter for converting the digital video signal read out of said video memory into an analog video signal, said special effect system comprising: luminance modifying means for being coupled between said video memory and said D/A converter for modifying a luminance level of the digital video signal read out of said video memory; and modified read address generator means comprising a distance calculator for calculating a distance between a position of each picture element of a video image and a defined straight line extending on the video image, a first function generator responsive to said distance for generating a first function by transforming said distance to produce said read address, and a second function generator responsive to said distance for generating a second function by transforming said distance to produce a control signal, wherein said luminance modifying means modifies the luminance level of the digital video signal in accordance with said control signal.

* * * * *